United States Patent
Wada et al.

(10) Patent No.: US 10,380,514 B2
(45) Date of Patent: Aug. 13, 2019

(54) SYSTEM FOR SETTING A DELIVERY COUNT RANK

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., LTD., Tokyo (JP)

( * ) Notice: Subject to any disclaimer, the term of this patent is extended or adjusted under 35 U.S.C. 154(b) by 629 days.

(21) Appl. No.: 15/059,293

(22) Filed: Mar. 2, 2016

(65) Prior Publication Data
US 2016/0180268 A1 Jun. 23, 2016

Related U.S. Application Data (63) Continuation of application No. 14/405,269, filed as application No. PCT/JP2013/003542 on Jun. 5, 2013, now abandoned.

(30) Foreign Application Priority Data

Jun. 5, 2012 (JP) .................................. 2012-128091

(51) Int. Cl.
G06Q 10/06 (2012.01)
G06Q 50/06 (2012.01)
(Continued)

(52) U.S. Cl.
CPC ....... *G06Q 10/06311* (2013.01); *G06Q 10/06* (2013.01); *G06Q 10/06398* (2013.01);
(Continued)

(58) Field of Classification Search
None
See application file for complete search history.

(56) References Cited

U.S. PATENT DOCUMENTS 4,782,451 A * 11/1988 Mazzarella ......... G01F 23/0069
340/680
4,845,486 A * 7/1989 Knight .................... G01F 23/36
340/618
(Continued)

FOREIGN PATENT DOCUMENTS

JP 2000187685 7/2000
JP 2002220119 8/2002
(Continued)

OTHER PUBLICATIONS

Bell, Walter J. et al., Improving the Distribution of Industrial Gases with an On-line Computerized Routing and Scheduling Optimizer, Interfaces, vol. 13, No. 6, Dec. 1983 (Year: 1983).*
(Continued)

*Primary Examiner* — Kurtis Gills
*Assistant Examiner* — Akosua Kyereme-Tuah
(74) *Attorney, Agent, or Firm* — Lee & Hayes, P.C.

(57) ABSTRACT

A system is provided for setting an appropriate delivery count rank expressing the delivery capability of a deliveryman. There is provided: a storage device that stores a delivery count rank for each deliveryman, a progress flag indicating whether or not each deliveryman is subject to a progress check, and a performance of each deliveryman in a designated period; and rank setting unit that calculates a total undelivered task count and an undelivered task rate on the basis of a total transmitted count and a total actual count included in the storage device, calculates a work attendance rate on the basis of a stipulated number of attendances and an actual number of attendances included in the storage device, and sets a delivery count rank for each deliveryman on the basis of the calculated total undelivered task count, undelivered task rate, work attendance rate, and a progress flag.

2 Claims, 10 Drawing Sheets

(51) Int. Cl.
    *G06Q 50/28*     (2012.01)
    *G06Q 10/08*     (2012.01)

(52) U.S. Cl.
    CPC .......... *G06Q 10/083* (2013.01); *G06Q 50/06* (2013.01); *G06Q 50/28* (2013.01)

(56) References Cited

U.S. PATENT DOCUMENTS

| | | | | |
|---|---|---|---|---|
| 5,128,861 | A * | 7/1992 | Kagami | G06Q 10/087 705/28 |
| 5,154,314 | A * | 10/1992 | Van Wormer | G06Q 10/087 141/20 |
| 5,272,638 | A * | 12/1993 | Martin | G01C 21/3446 340/990 |
| 5,343,387 | A * | 8/1994 | Honma | G06Q 10/063112 705/7.14 |
| 5,351,725 | A * | 10/1994 | Suthergreen | G01F 1/007 141/1 |
| 5,983,198 | A * | 11/1999 | Mowery | G06Q 10/08 340/989 |
| 6,336,362 | B1 * | 1/2002 | Duenas | G01F 15/063 73/313 |
| 6,370,341 | B1 * | 4/2002 | Haines | B41J 3/46 399/24 |
| 6,377,868 | B1 * | 4/2002 | Gardner, Jr. | A47L 15/0055 700/236 |
| 6,633,900 | B1 * | 10/2003 | Khalessi | H04W 12/08 709/202 |
| 6,715,514 | B2 * | 4/2004 | Parker, III | G06Q 10/08 141/1 |
| 6,850,895 | B2 * | 2/2005 | Brodersen | G06Q 10/06 705/7.14 |
| 6,898,435 | B2 * | 5/2005 | Milman | G06Q 10/0639 455/457 |
| 7,155,349 | B1 * | 12/2006 | Souluer | G01F 23/366 702/55 |
| 7,177,825 | B1 * | 2/2007 | Borders | G06Q 10/0631 705/26.81 |
| 7,292,993 | B2 * | 11/2007 | Uzzo | G01F 23/00 705/22 |
| 7,725,344 | B2 * | 5/2010 | Harrison | G06Q 10/06311 705/7.13 |
| 7,904,192 | B2 * | 3/2011 | Chua | G06Q 10/06 700/100 |
| 8,285,581 | B2 | 10/2012 | Abe et al. | |
| 8,321,253 | B2 * | 11/2012 | Mitchell | G06Q 10/06 705/7.13 |
| 8,386,283 | B2 * | 2/2013 | Hand | G06Q 10/047 705/7.11 |
| 8,612,276 | B1 * | 12/2013 | Nielsen | G06Q 10/063118 705/7.16 |
| 2002/0010615 | A1 * | 1/2002 | Jacobs | G06Q 10/02 705/7.15 |
| 2004/0162850 | A1 * | 8/2004 | Sanville | G05B 15/02 |
| 2005/0096856 | A1 * | 5/2005 | Lubkeman | G06Q 50/06 702/58 |
| 2006/0111089 | A1 * | 5/2006 | Winter | G06Q 10/06 455/414.1 |
| 2011/0112943 | A1 * | 5/2011 | Dietz | G06Q 10/06 705/32 |
| 2012/0173296 | A1 * | 7/2012 | McMullin | G06Q 10/06 705/7.14 |
| 2015/0149262 | A1 | 5/2015 | Wada et al. | |

FOREIGN PATENT DOCUMENTS

| | | |
|---|---|---|
| JP | 2002288291 | 10/2002 |
| JP | 2008071242 | 3/2008 |
| JP | 2008257541 | 10/2008 |

OTHER PUBLICATIONS

Herer, Yale T. et al., The metered inventory routing problem, an integrative heuristic algorithmInternational Journal of Production Economics, vol. 51, 1997 (Year: 1997).*

Golden, Bruce L. et al., Computerized Vehicle Routing in the Soft Drink IndustryOperations Research, vol. 35, No. 1, Feb. 1987 (Year: 1987).*

Bell et at., "Improving the Distribution of Industrial Gases with an On-line Computerized Routing and Scheduling Organizer," Air Products and Chemicals, vol. 13, No. 6, Dec. 1983, pp. 4-23.

Golden et al., "Computerized Vehicle Routing in the Soft Drink Industry," Operations Research, vol. 35, No. 1, Jan.-Feb. 1987, pp. 6-17.

Herer et al., "The metered inventory routing problem, an integrative heuristic algorithm," International Journal of Production Economics, vol. 41, 1997, pp. 69-81.

International Preliminary Examination Report on Patentability dated Dec. 18, 2014 for PCT application No. PCT/JP2013/003542, 6 pages.

Office action for U.S. Appl. No. 14/405,269, dated Nov. 2, 2015, Wada et al., "A System for a Delivery Count Rank," 14 pages.

Office Action for U.S. Appl. No. 14/405,269, dated Jul. 22, 2015, Shinji Wada, "A System for Setting Delivery Count Rank," 9 pages.

PCT Search Report dated Aug. 13, 2013 for PCT application No. PCT/JP2013/003542, 2 pages.

Office action for U.S. Appl. No. 14/405,269, dated Nov. 1, 2016, Wada et al., "A System for Setting a Delivery Count Rank", 16 pages.

* cited by examiner

| DELIVERY BASE CODE | DELIVERYMAN CODE | NAME | RANK |
|---|---|---|---|
| 18 | 1 | DELIVERYMAN A | 50 |
| 18 | 2 | DELIVERYMAN B | 60 |
| 18 | 3 | DELIVERYMAN C | 60 |
| 18 | 4 | DELIVERYMAN D | 60 |
| 18 | 5 | DELIVERYMAN E | 45 |
| 18 | 6 | DELIVERYMAN F | 40 |
| ... | ... | ... | ... |
| ... | ... | ... | ... |

FIG.5A

| DELIVERY BASE CODE | DELIVERYMAN CODE | NAME | RANK |
|---|---|---|---|
| 18 | 1 | DELIVERYMAN A | 55 |
| 18 | 2 | DELIVERYMAN B | 60 |
| 18 | 3 | DELIVERYMAN C | 60 |
| 18 | 4 | DELIVERYMAN D | 55 |
| 18 | 5 | DELIVERYMAN E | 45 |
| 18 | 6 | DELIVERYMAN F | 35 |
| ... | ... | ... | ... |
| ... | ... | ... | ... |

| DELIVERY BASE CODE | DELIVERYMAN CODE | TOTAL TRANSMITTED COUNT | TOTAL ACTUAL COUNT | STIPULATED NUMBER OF ATTENDANCES | ACTUAL NUMBER OF ATTENDANCES | PROGRESS FLAG |
|---|---|---|---|---|---|---|
| 18 | 1 | 1502 | 1498 | 26 | 26 | 0 |
| 18 | 2 | 1877 | 1804 | 27 | 26 | 0 |
| 18 | 3 | 1881 | 1754 | 27 | 26 | 0 |
| 18 | 4 | 1327 | 1200 | 23 | 21 | 1 |
| 18 | 5 | 1448 | 1413 | 27 | 27 | 0 |
| 18 | 6 | 893 | 777 | 20 | 19 | 1 |
| ... | ... | ... | ... | ... | ... | ... |

FIG.6B

| DELIVERY BASE CODE | DELIVERYMAN CODE | TOTAL TRANSMITTED COUNT | TOTAL ACTUAL COUNT | STIPULATED NUMBER OF ATTENDANCES | ACTUAL NUMBER OF ATTENDANCES | PROGRESS FLAG |
|---|---|---|---|---|---|---|
| 18 | 1 | 0 | 0 | 25 | 0 | 0 |
| 18 | 2 | 0 | 0 | 25 | 0 | 0 |
| 18 | 3 | 0 | 0 | 25 | 0 | 0 |
| 18 | 4 | 0 | 0 | 24 | 0 | 1 |
| 18 | 5 | 0 | 0 | 25 | 0 | 0 |
| 18 | 6 | 0 | 0 | 20 | 0 | 1 |
| ... | ... | ... | ... | ... | ... | ... |

FIG.6C

| DELIVERY BASE CODE | DELIVERYMAN CODE | TOTAL TRANSMITTED COUNT | TOTAL ACTUAL COUNT | STIPULATED NUMBER OF ATTENDANCES | ACTUAL NUMBER OF ATTENDANCES | PROGRESS FLAG |
|---|---|---|---|---|---|---|
| 18 | 1 | 0 | 0 | 25 | 0 | 0 |
| 18 | 2 | 0 | 0 | 25 | 0 | 0 |
| 18 | 3 | 0 | 0 | 25 | 0 | 1 |
| 18 | 4 | 0 | 0 | 24 | 0 | 0 |
| 18 | 5 | 0 | 0 | 25 | 0 | 0 |
| 18 | 6 | 0 | 0 | 20 | 0 | 0 |
| ... | ... | ... | ... | ... | ... | ... |

| DELIVERY BASE CODE | DELIVERYMAN CODE | TOTAL TRANSMITTED COUNT | TOTAL ACTUAL COUNT | TOTAL UNDELIVERED TASK COUNT | UNDELIVERED TASK RATE | STIPULATED NUMBER OF ATTENDANCES | ACTUAL NUMBER OF ATTENDANCES | WORK ATTENDANCE RATE | OLD RANK 1 | OLD RANK 2 |
|---|---|---|---|---|---|---|---|---|---|---|
| 18 | 1 | 1502 | 1498 | 4 | 0.27 | 26 | 26 | 100 | 50 | 50 |
| 18 | 2 | 1877 | 1804 | 73 | 3.89 | 27 | 26 | 96 | 60 | 60 |
| 18 | 3 | 1881 | 1754 | 127 | 6.75 | 27 | 26 | 96 | 60 | 60 |
| 18 | 4 | 1327 | 1200 | 127 | 9.57 | 23 | 21 | 91 | 60 | 60 |
| 18 | 5 | 1448 | 1413 | 35 | 2.42 | 27 | 27 | 100 | 45 | 50 |
| 18 | 6 | 893 | 777 | 116 | 12.99 | 20 | 19 | 95 | 40 | 40 |
| ∗ | ∗ | ∗ | ∗ | ∗ | ∗ | ∗ | ∗ | ∗ | ∗ | ∗ |

| DELIVERY BASE CODE | | DELIVERYMAN CODE | NAME OF PERSON IN CHARGE | TOTALS | | |
|---|---|---|---|---|---|---|
| CODE | NAME | | | TRANSMITTED COUNT | ACTUAL COUNT | UNDELIVERED TASK COUNT |
| 18 | DELIVERY BASE X | 1 | DELIVERYMAN A | 1,502 | 1,498 | 4 |
| | | 2 | DELIVERYMAN B | 1,877 | 1,804 | 73 |
| | | 3 | DELIVERYMAN C | 1,881 | 1,754 | 127 |
| | | 4 | DELIVERYMAN D | 1,327 | 1,200 | 127 |
| | | 5 | DELIVERYMAN E | 1,448 | 1,413 | 35 |
| | | 6 | DELIVERYMAN F | 893 | 777 | 116 |
| COMBINED TOTAL | | | | 8,928 | 8,446 | 482 |

| UNDELIVERED TASK RATE | STIPULATED NUMBER OF ATTENDANCES | ACTUAL NUMBER OF ATTENDANCES | WORK ATTENDANCE RATE | PERFORMANCE CYLINDERS /DAY | OLD RANK 2 | OLD RANK 1 | NEW RANK 1 |
|---|---|---|---|---|---|---|---|
| 0.27 | 26 | 26 | 100 | 57.6 | 50 | 50 | 55 |
| 3.89 | 27 | 26 | 96 | 69.4 | 60 | 60 | 60 |
| 6.75 | 27 | 26 | 96 | 67.5 | 60 | 60 | 60 |
| 9.57 | 23 | 21 | 91 | 57.1 | 60 | 60 | 55 |
| 2.42 | 27 | 27 | 100 | 52.3 | 50 | 45 | 45 |
| 12.99 | 20 | 19 | 95 | 40.9 | 40 | 40 | 35 |
| 5.40 | 31 | 31 | 100.00 | 272.5 | 320 | 315 | 310 |

FIG.9

SYSTEM FOR SETTING A DELIVERY COUNT RANK

This Application is a continuation of and claims priority to U.S. patent application Ser. No. 14/405,269, filed Dec. 3, 2014, the disclosure of which is incorporated by reference herein and which is a national stage application of and claims priority to PCT patent application PCT/JP2013/003542, filed Jun. 5, 2013, which in turn claims priority to patent application JP 2012-128091, filed on Jun. 5, 2012 in Japan, which issued as a patent on Jan. 17, 2014.

TECHNICAL FIELD

The present invention relates to a delivery count rank setting system for liquid petroleum (LP) gas cylinders. More particularly, the present invention relates to a system for setting a delivery count rank to deliverymen working for a delivery base.

BACKGROUND ART

The supply of LP gas is divided into importation from industrial gas-producing countries, and domestic production obtained as a by-product of the production process for petroleum products. Import terminals that store LP gas carried by tankers from industrial gas-producing countries, as well as petroleum refining bases, are respectively called primary terminals. LP gas is loaded onto coastal vessels and tank trucks, and shipped from primary terminals to secondary terminals, which are transit stations located along the coast or inland for LP gas shipping. Additionally, LP gas carried to secondary terminals is shipped to local LP gas filling stations, filled in LP gas cylinders at the filling stations, and delivered to individual homes and factories.

A delivery area is defined for each filling station, which acts as a delivery base. In the past, a delivery base supervisor divided the delivery area into fixed sub-areas, and assigned to each sub-area a deliveryman in charge of that sub-area.

A fixed number of deliverymen work for each delivery base. As discussed above, in the past, the delivery base supervisor divided the delivery area into fixed sub-areas, and assigned to each sub-area a deliveryman in charge of that sub-area. For example, if deliverymen 1, 2, 3, 4, and 5, for a total of five deliverymen, work for a delivery base A, the supervisor divided the delivery area into five sub-areas a, b, c, d, and e, and assigned deliveryman 1 to sub-area a, deliveryman 2 to sub-area b, and so on, up to deliveryman 5 assigned to sub-area e.

When managing a delivery area in this way, a problem arises in which customers whose delivery is scheduled on the same day become clustered in a specific sub-area. This occurs because the timing for delivering an LP gas cylinder, although decided by predicting the remaining gas amount for each customer, has a consumption cycle that differs for each customer. Also, if a temporary substitute deliveryman is needed because a deliveryman takes a leave, there is a problem of how to allocate the sub-area handled by the deliveryman on leave. In this case, there is also the problem of reduced delivery efficiency due to allocating the sub-area handled by the deliveryman on leave to a substitute deliveryman who is unfamiliar with the area. Furthermore, every time there is a change in the number of associated deliverymen due to a decrease or increase in deliveryman, or every time a reevaluation of the sub-area definition is required because of factors such as an increase in new customers in a specific sub-area, the supervisor must redefine the sub-areas and reassign deliverymen into the newly defined sub-areas.

In order to solve such problems, the inventor has succeeded in providing means to conduct area management in accordance with the delivery capability of a deliveryman by dividing the delivery area of a delivery base into sub-areas according to "a delivery count rank" expressing the number of gas cylinders that a deliveryman is able to deliver in a single day. With this technology, if a delivery base A employing a deliveryman A (delivery count rank 30), B (delivery count rank 20), C (delivery count rank 20), D (delivery count rank 20), and E (delivery count rank 10) has 100 gas cylinders to be delivered in a single day, the delivery area is divided into sub-areas so that the deliverymen are assigned 30, 20, 20, 20, and 10 cylinders, respectively.

Patent Literature 1 discloses a delivery vehicle driver employee management system intended to manage delivery vehicle driver employees who are responsible for shipping. Patent Literature 1 was devised in light of the demand for not only driving services and driving-related services, and various associated services such as sales, marketing, and proposal-making in transportation business, and the objective thereof is to support efficient and appropriate assignment decisions by comprehensively grasping both the capability/suitability of each delivery vehicle driver employee as well as customer demands.

With the above technology that divides the delivery area of a delivery base into sub-areas according to delivery count rank, an appropriate setting of delivery count rank provides a stable supply of gas cylinders. If a deliveryman is assigned a delivery count rank that is above that deliveryman's capability, there is an increased risk of being unable to deliver to customers on the delivery due date. On the other hand, if a deliveryman is assigned a delivery count rank that is below that deliveryman's capability, extra deliverymen who are not actually needed are judged to be necessary, and excess costs are incurred.

Also, if a deliveryman is assigned a delivery count rank that is inappropriate for that deliveryman's capability, it becomes difficult to appropriately judge the deliveryman's capability that should be ensured for the delivery base overall.

Consequently, there is demand for a system for setting an appropriate delivery count rank expressing the delivery capability of a deliveryman.

Patent Literature 1 grasps the capability of driver employees and supports appropriate assignment decisions, particularly with the objective of suitable personnel assignment based on a performance evaluation of employees who carry out service work demanded in association with driving work, but differs from the present invention, which sets delivery capability for the purpose of a stable supply of gas cylinders.

CITATION LIST

Patent Literature

PLT 1: Japanese Patent Laid-Open No. 2008-257541

SUMMARY OF INVENTION

In order to solve the above problems, a delivery count rank setting system according to the present invention comprises: a storage device that stores a delivery count rank for each deliveryman, a progress flag indicating whether or not each deliveryman is subject to a progress check, and a performance of each deliveryman in a designated period, the performance including a total transmitted count, a total actual count, a stipulated number of attendances, and an actual number of attendances; and rank setting unit that calculates a total undelivered task count and an undelivered task rate on the basis of the total transmitted count and the total actual count, calculates a work attendance rate on the basis of the stipulated number of attendances and the actual number of attendances, and sets a delivery count rank for each deliveryman on the basis of the total undelivered task count, the undelivered task rate, the work attendance rate, and the progress flag. The rank setting unit specifies a deliveryman in a blue zone on the basis of the total undelivered task count, the undelivered task rate, and the work attendance rate, sets the delivery count rank of a deliveryman in the blue zone included in the storage device, specifies a deliveryman in a yellow zone on the basis of the undelivered task rate, and determines the setting of the progress flag of a deliveryman in the yellow zone included in the storage device. If the progress flag indicates that the deliveryman is not subject to a progress check, the rank setting unit sets the progress flag of the deliveryman in the yellow zone to a value indicating that the deliveryman is subject to a progress check. If the progress flag indicates that the deliveryman is subject to a progress check, the rank setting unit sets the progress flag of the deliveryman in the yellow zone to a value indicating that the deliveryman is not subject to a progress check, and in addition, sets the delivery count rank of the deliveryman in the yellow zone included in the storage device. The rank setting unit sets the progress flag of a deliveryman other than the specified deliveryman in the yellow zone to a value indicating that the deliveryman is not subject to a progress check, specifies a deliveryman in a red zone on the basis of the undelivered task rate, and sets the delivery count rank of a deliveryman in the red zone included in the storage device.

By appropriately setting the delivery count rank of deliverymen, delivery volume may be controlled according to delivery count rank, and gas cylinders may be supplied stably. Additionally, in the management of personnel to be assigned to a delivery area, it is possible to achieve an appropriate personnel configuration that is based on delivery count rank. Furthermore, by varying wages according to the delivery count rank that reflects the delivery capability of the deliverymen, it is possible to pay wages commensurate with the delivery capability of the deliverymen.

DESCRIPTION OF EMBODIMENTS

Hereinafter, a delivery system according to an embodiment of the invention will be described in detail and with reference to the attached drawings.

(Overview of Delivery System)

Figure 1:
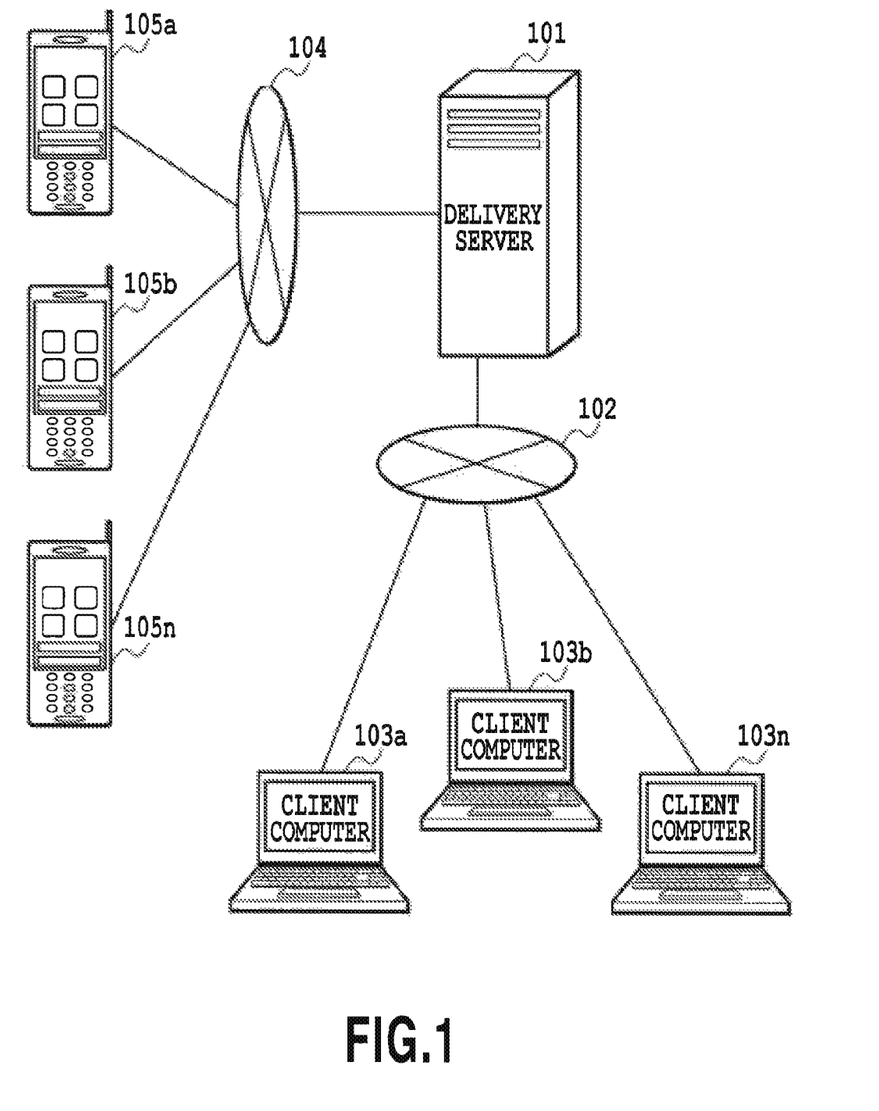
FIG. 1 is a diagram illustrating a network topology according to an embodiment of the present invention.

First, an overview of an LP gas cylinder delivery system will be described. FIG. 1 is a diagram illustrating a network topology according to an embodiment of the present invention. In FIG. 1, a delivery server 101 installed in a head office is configured to communicate, via a network 102, with multiple client computers 103a, 103b, ..., 103n (hereinafter called the client computers 103) installed in a delivery center that centrally manages deliveries at each delivery base. In addition, the delivery server 101 is configured to communicate, via a network 104, with multiple mobile terminals 105a, 105b, 105n (hereinafter called the mobile terminals 105).

The delivery server 101 generates delivery data for each delivery base by aggregating data on gas cylinders to be delivered from the delivery base the next day, and data on gas cylinders that were scheduled to be delivered today but could not be delivered. After that, the delivery server 101 assigns the generated delivery data to each deliveryman working at the delivery base, and generates delivery schedule data per deliveryman.

In response to a delivery data request from a deliveryman's mobile terminal 105, the delivery server 101 also transmits the delivery schedule data per deliveryman corresponding to that deliveryman via the network 104. Additionally, the delivery server 101 receives delivery operation data (that is, data on gas cylinders that were delivered today) or undelivered task data (that is, data on gas cylinders that were not delivered today) by deliverymen from the mobile terminals 105, and uses the received data to update a storage unit included in the delivery server 101.

The client computer 103 is a terminal used by a user at a delivery center. The user connects to the delivery server 101 via the client computer 103 to perform work specific to delivery services, such as checking delivery status and transmitting a delivery data creation instruction. In the present embodiment, the client computer 103 is installed in the delivery center, but may also be installed in the head office like the delivery server 101, or installed in the delivery base.

The mobile terminal 105 is a terminal provided to each deliveryman at the delivery base. The deliveryman connects to the delivery server 101 via the mobile terminal 105, and transmits a delivery data request. Also, the deliveryman connects to the delivery server 101 via the mobile terminal 105, and transmits information such as each deliveryman's delivery operation data and undelivered task data.

(Daily Processes)

Figure 2:
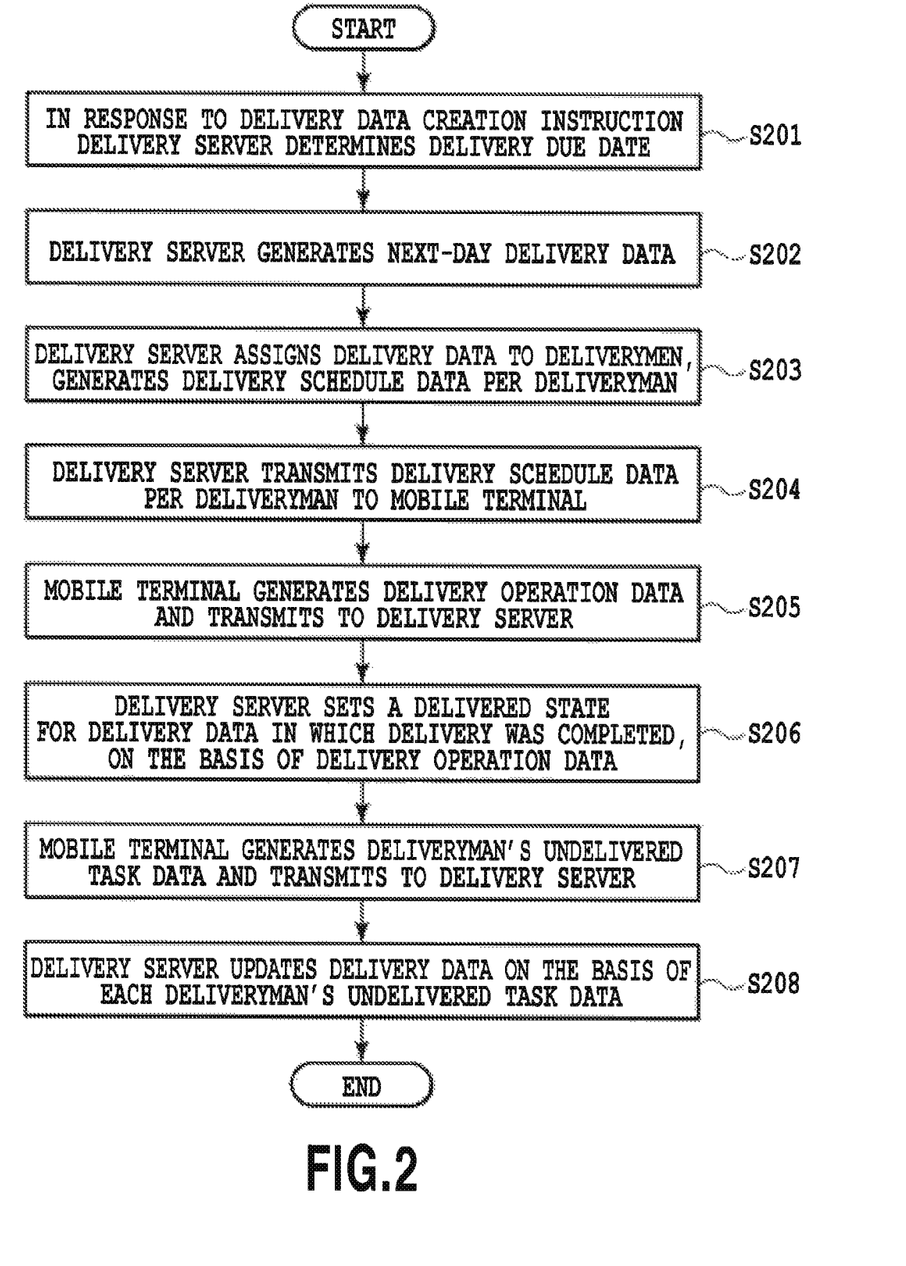
FIG. 2 is a flowchart illustrating a series of daily processes by a delivery system according to an embodiment of the present invention.

Next, the flowchart in FIG. 2 will be used to describe a series of daily processes conducted by a delivery system according to an embodiment.

Suppose that a user at a delivery center connects to the delivery server 101 via a client computer 103, and transmits a delivery data creation instruction. The delivery server 101 receives the delivery data creation instruction, predicts the remaining amount of the LP gas in the gas cylinder for customers under the jurisdiction of each delivery base on the basis of data for each customer (past gas usage history, meter data, and cylinder delivery history), and determines the next delivery due date (S201). The delivery server 101 generates delivery data for each delivery base by aggregating the data for customers whose delivery due date is the next day (such as a customer ID, a number of gas cylinders, and address data), and each delivery base's undelivered task data that could not be delivered from among the delivery data to be delivered today (such as a customer ID, a number of gas cylinders, and address data) (S202). Note that the generated delivery data is stored in the delivery server 101 for a fixed period, and the completion of deliveries by deliverymen may be managed on the basis of delivery operation data transmitted from the mobile terminals 105.

Next, the delivery server 101 assigns the delivery data generated for each delivery base to deliverymen working at that delivery base, and generates delivery schedule data per deliveryman (S203). The delivery server 101 extracts the data of deliverymen working at a base, and assigns delivery data on the basis of a predetermined standard. By completing the generation of delivery schedule data per deliveryman, preparations are complete for responding to a delivery data request from the mobile terminal 105. After generating the delivery schedule data per deliveryman, the delivery server 101 may transmit a message notifying the mobile terminal 105 of this state.

When a deliveryman connects to the delivery server 101 via their mobile terminal 105 and transmits a delivery data request, the delivery server 101 conducts an authentication process that checks identification information of the deliveryman, and transmits the delivery schedule data per deliveryman corresponding to the authenticated deliveryman to the mobile terminal 105 (S204).

The deliveryman makes deliveries to customers on the basis of the delivery schedule data per deliveryman. During delivery, the deliveryman generates delivery operation data via the mobile terminal 105, and transmits the delivery operation data to the delivery server 101 (S205). The delivery operation data includes a customer ID and the container barcodes of the exchanged gas cylinders. Note that a container barcode may be scanned by using a barcode reader function of the mobile terminal 105. At this point, during delivery, the deliveryman may perform work in addition to exchanging gas cylinders, such as reading the gas meter and inspecting the gas supply equipment. In this case, the deliveryman may generate delivery operation data that includes additional work data via the mobile terminal 105, and transmit the delivery operation data to the delivery server 101.

The delivery server 101 receives the delivery operation data, and on the basis of the received delivery operation data, sets a delivered state for the delivery data in which delivery was completed by the deliveryman (S206). If the delivery operation data includes additional work data, the delivery server 101 uses the additional work data to update the storage unit included in the delivery server 101.

Hypothetically, if delivery could not be completed on that day for a portion of customers included in the delivery schedule data per deliveryman, the deliveryman generates deliveryman's undelivered task data via the mobile terminal 105, and transmits the deliveryman's undelivered task data to the delivery server 101 (S207). In an embodiment, the deliveryman's undelivered task data may be configured to include a customer ID for which a delivery could not be completed.

The delivery server 101 receives each deliveryman's undelivered task data, and on the basis of the received each deliveryman's undelivered task data, updates the delivery data that was stored in S202 (S208). If deliveryman's undelivered task data includes a customer ID for which a delivery could not be completed, the customer ID is used to set an undelivered state for the customer ID included in the deliveryman's undelivered task data from among the delivery data. The updated delivery data may be used to create each delivery base's undelivered task data in S202 the following day.

(Periodic Processes)

Figure 3:
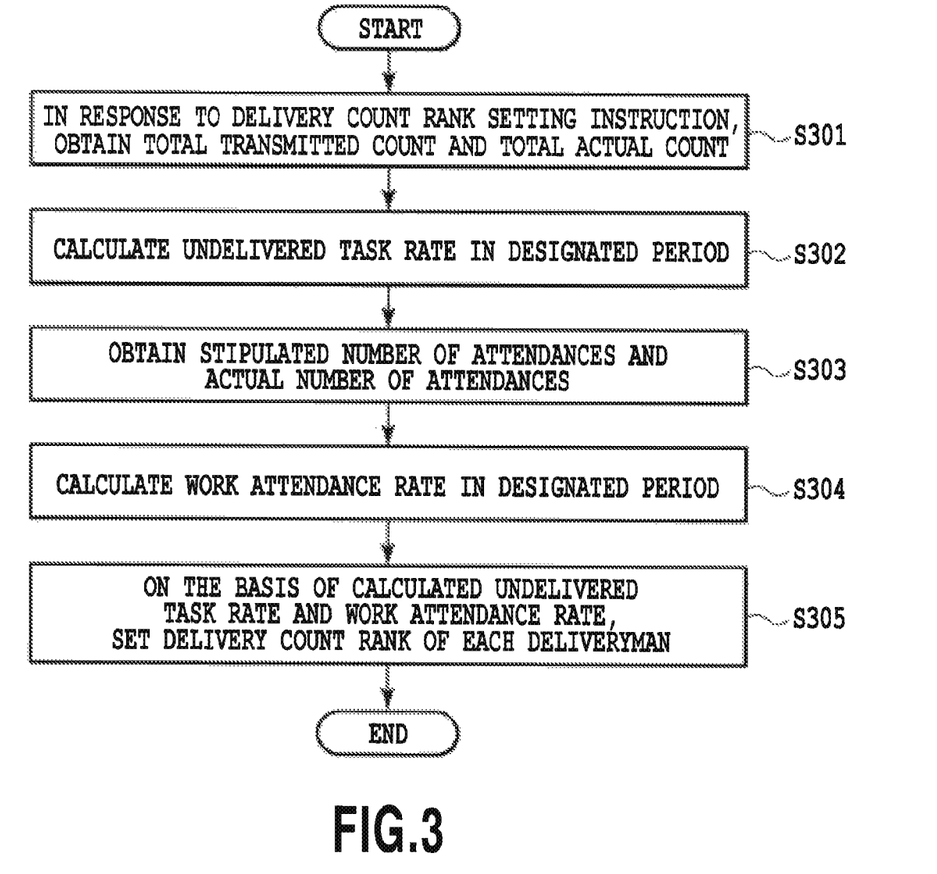
FIG. 3 is a flowchart illustrating a series of monthly processes by a delivery system according to an embodiment of the present invention.

Next, the flowchart in FIG. 3 will be used to describe a series of periodic processes conducted by a delivery system according to an embodiment.

Suppose that a user at a delivery center connects to the delivery server 101 via a client computer 103, and transmits a delivery count rank setting instruction. The delivery server 101 receives the delivery count rank setting instruction, and for each deliveryman, obtains a total transmitted count and a total actual count within a designated period from a storage unit included in the delivery server 101 (S301). The total transmitted count is a total of the number of cylinders included in the delivery schedule data per deliveryman within the designated period. The total actual count is a total of the number of cylinders that were delivered on the scheduled day from among the number of cylinders included in the delivery schedule data per deliveryman within the designated period.

After the total transmitted count and the total actual count are obtained, the undelivered task rate in the designated period is calculated (S302).

$$\text{undelivered task rate} = \frac{\text{total transmitted count} - \text{total actual count}}{\text{total transmitted count}} \times 100$$

Next, the delivery server 101 obtains for each deliveryman a stipulated number of attendances and an actual number of attendances from a storage unit included in the delivery server 101 (S303). The stipulated number of attendances is the number of days after subtracting public holidays from the number of days within the designated period, while the actual number of attendances is the number of days that the deliveryman worked within the designated period. After the stipulated number of attendances and the actual number of attendances are obtained, the work attendance rate in the designated period is calculated (S304).

$$\text{work attendance rate} = \frac{\text{actual number of attendances}}{\text{stipulated number of attendances}} \times 100$$

The delivery server 101 sets the delivery count rank of each deliveryman on the basis of the calculated undelivered task rate and work attendance rate (S305).

(Configuration of Delivery Server)

Figure 4:
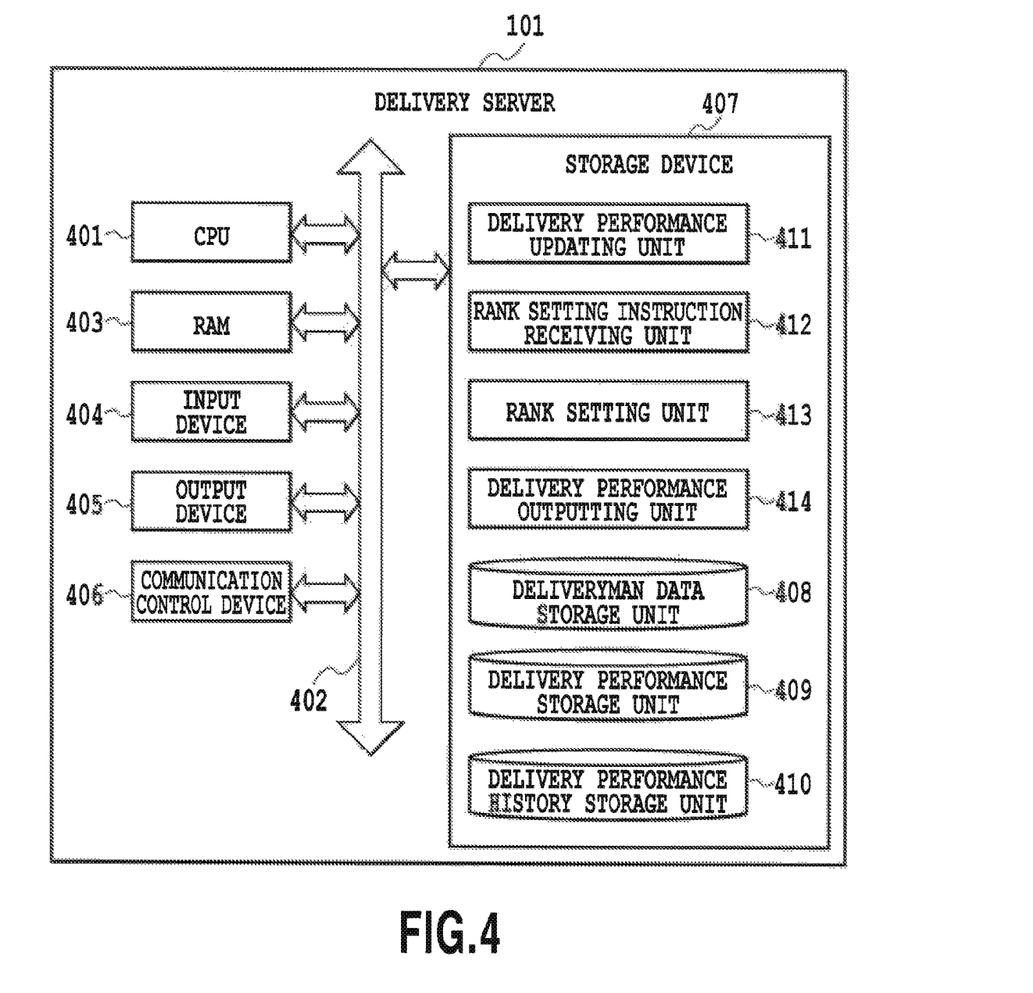
FIG. 4 is a block diagram illustrating a configuration of a delivery server according to an embodiment of the present invention.

Next, a configuration of the delivery server 101 discussed above will be described in detail with reference to the block diagram in FIG. 4. Note that although FIG. 4 envisions a single computer system and illustrates only the necessary functional configuration, the delivery server 101 may also be configured as part of a multi-functional distributed system made up of multiple computer systems.

The delivery server 101 includes a configuration in which RAM 403, an input device 404, and output device 405, a communication control device 406, and a storage device 407 provided with a non-volatile storage medium (such as ROM or an HDD) are connected to a CPU 401 via a system bus 402. The storage device 407 is provided with a program storage area that stores software programs for performing the above functions, and a data storage area that stores information such as data obtained as needed and data as a processing result. The respective units of the program storage area described hereinafter are actually independent software programs, or sub-routines or components thereof. Additionally, the respective unit above performs respective functions by being called from the storage device 407 and loaded into a work area of the RAM 403 by the CPU 401, and by being sequentially executed while appropriately referencing information such as a database.

The data storage area is provided with a deliveryman data storage unit 408, a delivery performance storage unit 409, and a delivery performance history storage unit 410. All are fixed storage areas reserved inside the storage device 407.

Figure 5A:
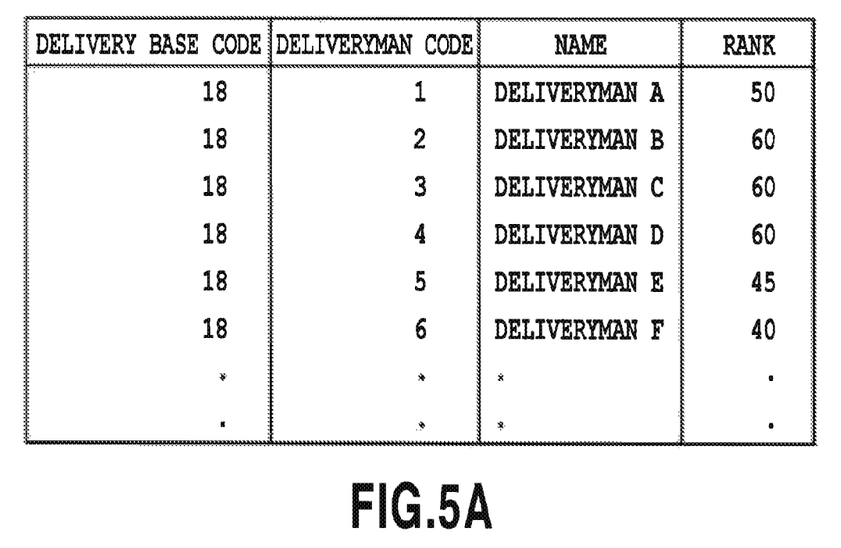
FIG. 5A is a diagram illustrating an example of information stored in a deliveryman data storage unit according to an embodiment of the present invention.
Figure 5B:
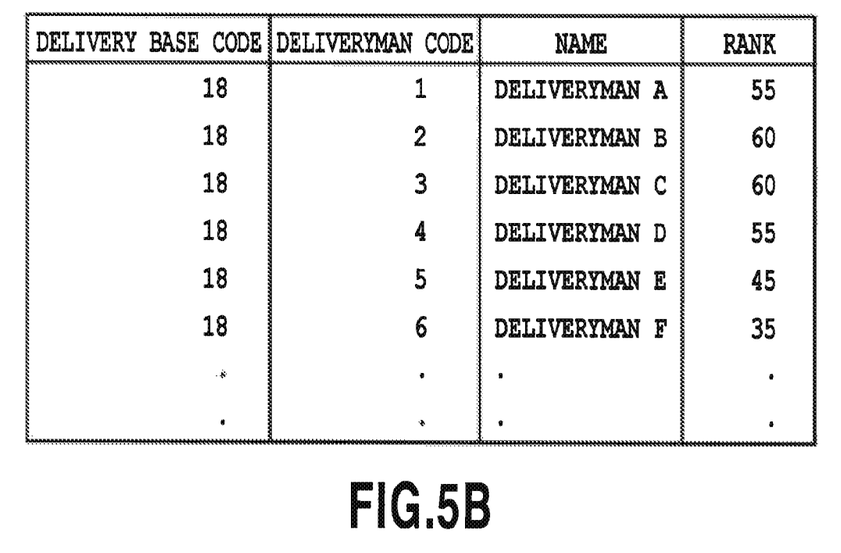
FIG. 5B is a diagram illustrating an example of information stored in a deliveryman data storage unit according to an embodiment of the present invention.

The deliveryman data storage unit 408 stores information related to deliverymen. In an embodiment, the deliveryman data storage unit 408 stores a delivery base code identifying the delivery base to which the deliveryman is assigned, a deliveryman code identifying the deliveryman, a name, and a rank, as illustrated in FIGS. 5A and 5B. The rank expresses the number of gas cylinders that the deliveryman is able to deliver in one day.

The delivery performance storage unit 409 stores information related to delivery performance. In an embodiment, the delivery performance storage unit 409 stores a delivery base code, a deliveryman code, a total transmitted count, a total actual count, a stipulated number of attendances, an actual number of attendances, and a progress flag indicating whether or not progress is being checked, as illustrated from FIGS. 6A to 6C, and manages the performance of each deliveryman in a designated period. In the present embodiment, the periodic processes are assumed to be executed monthly, and the performances from the first day to the last day of the month are accumulated in the delivery performance storage unit 409.

Figure 6A:
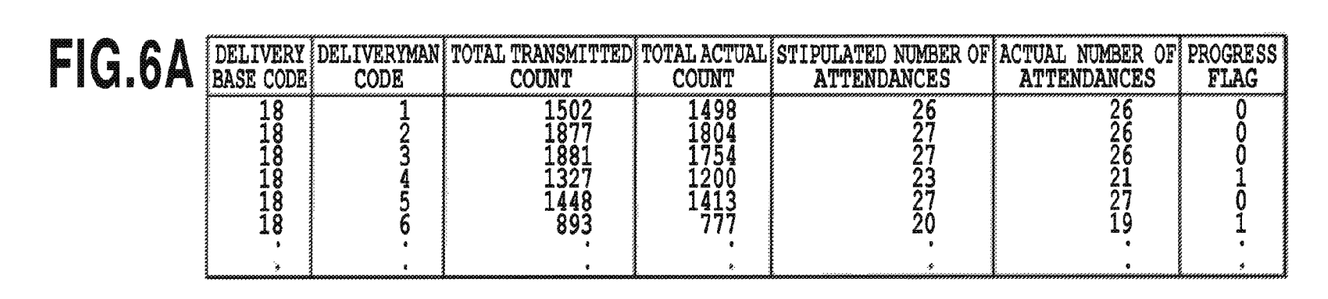
FIG. 6A is a diagram illustrating an example of information stored in a delivery performance storage unit according to an embodiment of the present invention.
Figure 6B:
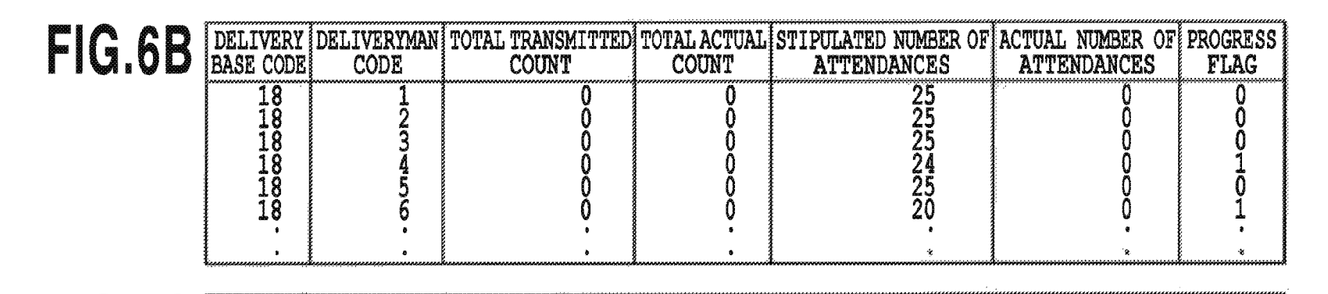
FIG. 6B is a diagram illustrating an example of information stored in a delivery performance storage unit according to an embodiment of the present invention.
Figure 6C:
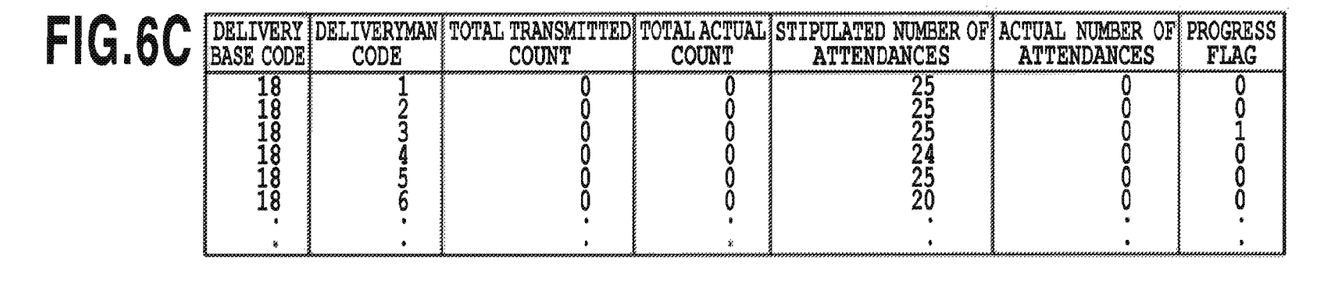
FIG. 6C is a diagram illustrating an example of information stored in a delivery performance storage unit according to an embodiment of the present invention.

The delivery base code and the deliveryman code respectively include corresponding codes in the deliveryman data storage unit 408. The total transmitted count includes a total of the number of cylinders included in the delivery schedule data per deliveryman from the first day to the last day of the month. The total actual count includes a total of the number of cylinders that were delivered on the scheduled day from among the number of cylinders included in the delivery schedule data per deliveryman from the first day to the last day of the month. The stipulated number of attendances includes the number of days after subtracting public holidays from the number of days from the first day to the last day of the month. The actual number of attendances includes the number of days that the deliveryman attended work from the first day to the last day of the month. The progress flag is off "0" if progress is not being checked, and is on "1" if progress is being checked.

Figure 7:
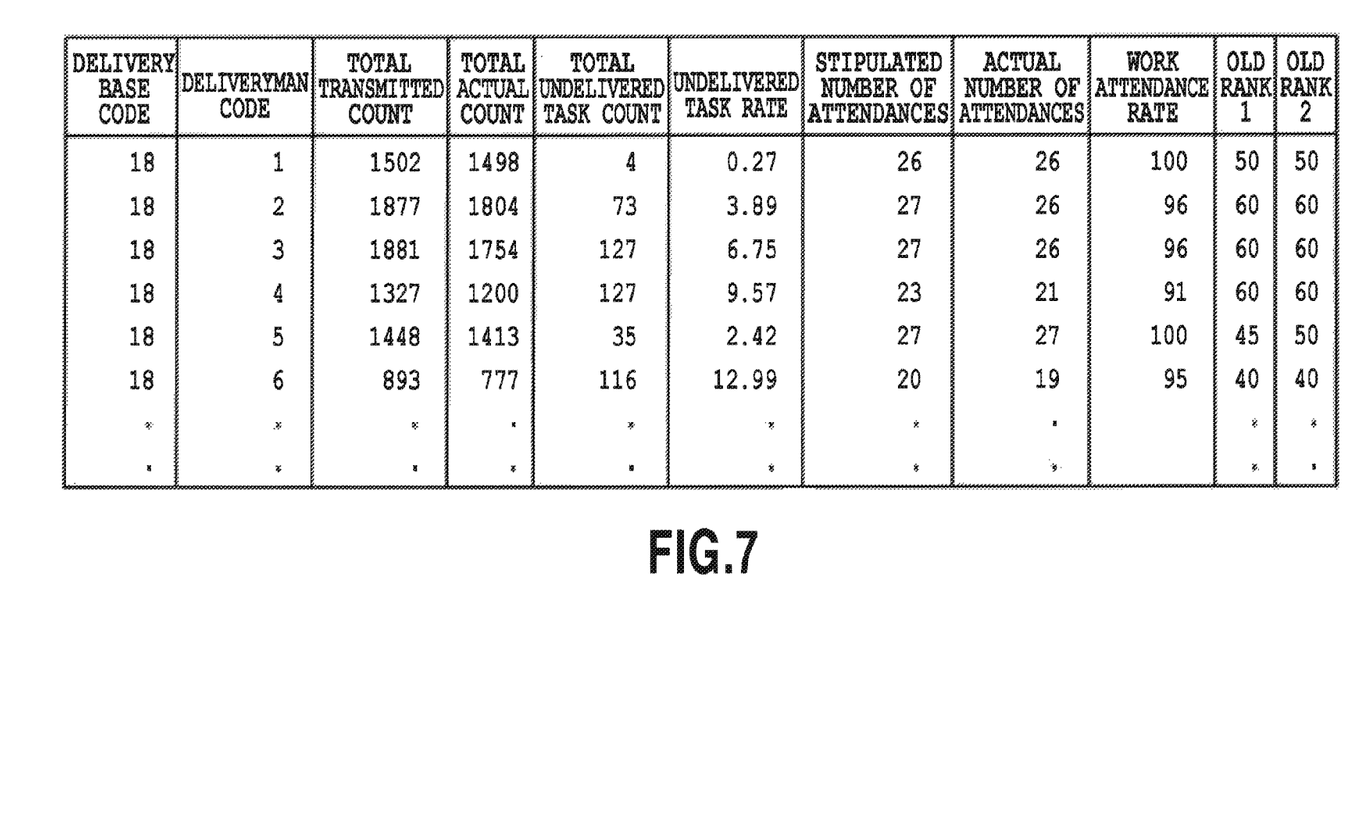
FIG. 7 is a diagram illustrating an example of information stored in a delivery performance history storage unit according to an embodiment of the present invention.

The delivery performance history storage unit 410 stores information related to a history of delivery performance. In an embodiment, the delivery performance history storage unit 410 stores a delivery base code, a deliveryman code, a total transmitted count, a total actual count, a total undelivered task count, an undelivered task rate, a stipulated number of attendances, an actual number of attendances, a work attendance rate, an old rank 1, and an old rank 2, as illustrated in FIG. 7, and manages a history of the performance of each deliveryman.

The delivery base code and the deliveryman code respectively include corresponding codes in the deliveryman data storage unit 408. In response to a delivery count rank setting instruction, corresponding values in the delivery performance storage unit 409 are stored in the total transmitted count, the total actual count, the stipulated number of attendances, and the actual number of attendances respectively. Note that after the corresponding values in the delivery performance storage unit 409 are stored in the delivery performance history storage unit 410, the total transmitted count, the total actual count, the stipulated number of attendances, and the actual number of attendances in the delivery performance storage unit 409 are initialized.

The total undelivered task count includes the value of (total transmitted count-total actual count). The undelivered task rate includes the value of (total undelivered task count/total transmitted count*100). The work attendance rate includes the value of (actual number of attendances/stipulated number of attendances*100). In response to a delivery count rank setting instruction, the value of the old rank 1 is stored in the old rank 2. In response to a delivery count rank setting instruction, the value of the rank in the deliveryman data storage unit 408 is stored in the old rank 1.

The software programs stored in the program storage area are, if citing only examples related to the present invention, delivery performance updating unit 411, rank setting instruction receiving unit 412, rank setting unit 413, and delivery performance outputting unit 414.

The delivery performance updating unit 411 updates the total transmitted count, the total actual count, and the actual number of attendances in the delivery performance storage unit 409. In an embodiment, the delivery performance updating unit 411, in response to the generation of delivery schedule data per deliveryman generated in S203 of the daily processes, adds to the total transmitted count the number of gas cylinders that the deliveryman should deliver on a delivery due date included in that delivery schedule data per deliveryman. Also, using delivery data updated on the basis of each deliveryman's delivery operation data and undelivered task data transmitted from the mobile terminal 105, the delivery performance updating unit 411 adds to the total actual count the number of gas cylinders of which delivery was completed by the deliveryman on a delivery due date. Also, in response to the update of the total actual count, the delivery performance updating unit 411 increments the value of the actual number of attendances.

The rank setting instruction receiving unit 412, in response to a delivery count rank setting instruction, stores the value of the old rank 1 in the delivery performance history storage unit 410 in the old rank 2, and stores the value of the rank in the deliveryman data storage unit 408 in the old rank 1. In addition, the rank setting instruction receiving unit 412 respectively stores the values of the total transmitted count, the total actual count, the stipulated number of attendances, and the actual number of attendances from the delivery performance storage unit 409 in the delivery performance history storage unit 410. After that, the rank setting instruction receiving unit 412 initializes the total transmitted count, the total actual count, the stipulated number of attendances, and the actual number of attendances in the delivery performance storage unit 409, specifically, stores 0 in the total transmitted count, the total actual count, and the actual number of attendances, and stores the stipulated number of attendances for the next month in the stipulated number of attendances.

The rank setting unit 413, on the basis of the total transmitted count and the total actual count in the delivery performance history storage unit 410, calculates and stores the total undelivered task count and the undelivered task rate in the delivery performance history storage unit 410. Also, the rank setting unit 413, on the basis of the stipulated number of attendances and the actual number of attendances in the delivery performance history storage unit 410, calculates and stores the work attendance rate in the delivery performance history storage unit 410.

Lastly, the rank setting unit 413 sets the delivery count rank of each deliveryman on the basis of the undelivered task rate and the work attendance rate. In the present embodiment, the delivery count rank of each deliveryman is set on the basis of the total undelivered task count and the progress flag in addition to the undelivered task rate and the work attendance rate. In an embodiment, if the total undelivered task count is a single-digit number, the undelivered task rate is less than 1%, and the work attendance rate is 100%, the rank setting unit 413 sets the delivery count rank by adding 5 to the rank of the relevant deliveryman in the deliveryman data storage unit 408. Also, if the undelivered task rate is from 5.0% to 9.9%, the rank setting unit 413 determines that the relevant deliveryman is to be subjected to a progress check. In an embodiment, if the progress check continues for two months, the delivery count rank is set by subtracting 5 from the rank of the relevant deliveryman in the deliveryman data storage unit 408. Furthermore, if the undelivered task rate is 10% or more, the rank setting unit 413 sets the delivery count rank by subtracting 5 from the rank of the relevant deliveryman in the deliveryman data storage unit 408.

The delivery performance outputting unit 414 uses the deliveryman data storage unit 408 and the delivery performance history storage unit 410 to transmit a delivery performance display to the client computer 103. In an embodiment, the delivery performance outputting unit 414 may highlight the total undelivered task count, undelivered task rate, and work attendance rate that cause a change in the delivery count rank setting.

(Process of Setting Delivery Count Rank)

Figures 8, 8A:
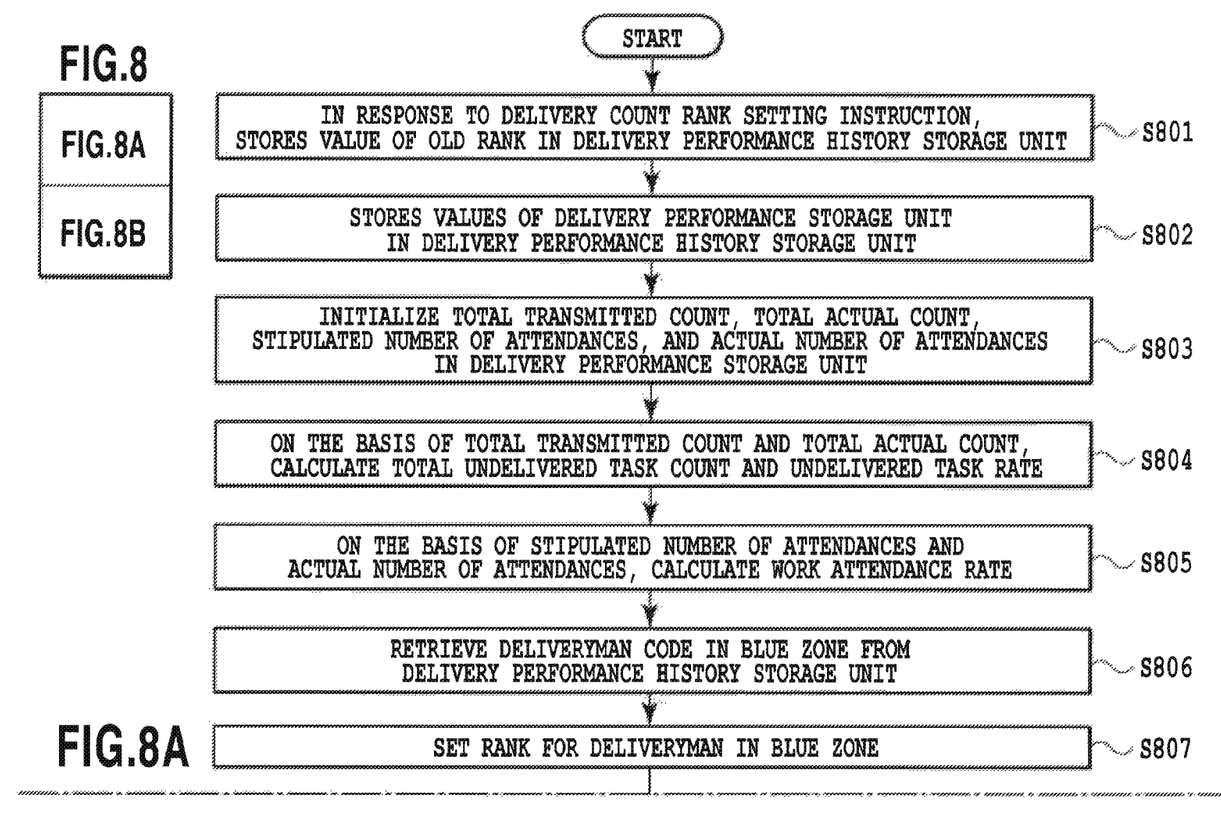
FIG. 8 is a diagram illustrating the relationship between FIG. 8A and FIG. 8B.
FIG. 8A is a flowchart illustrating a process of setting a delivery rank count according to an embodiment of the present invention.
Figure 8B:
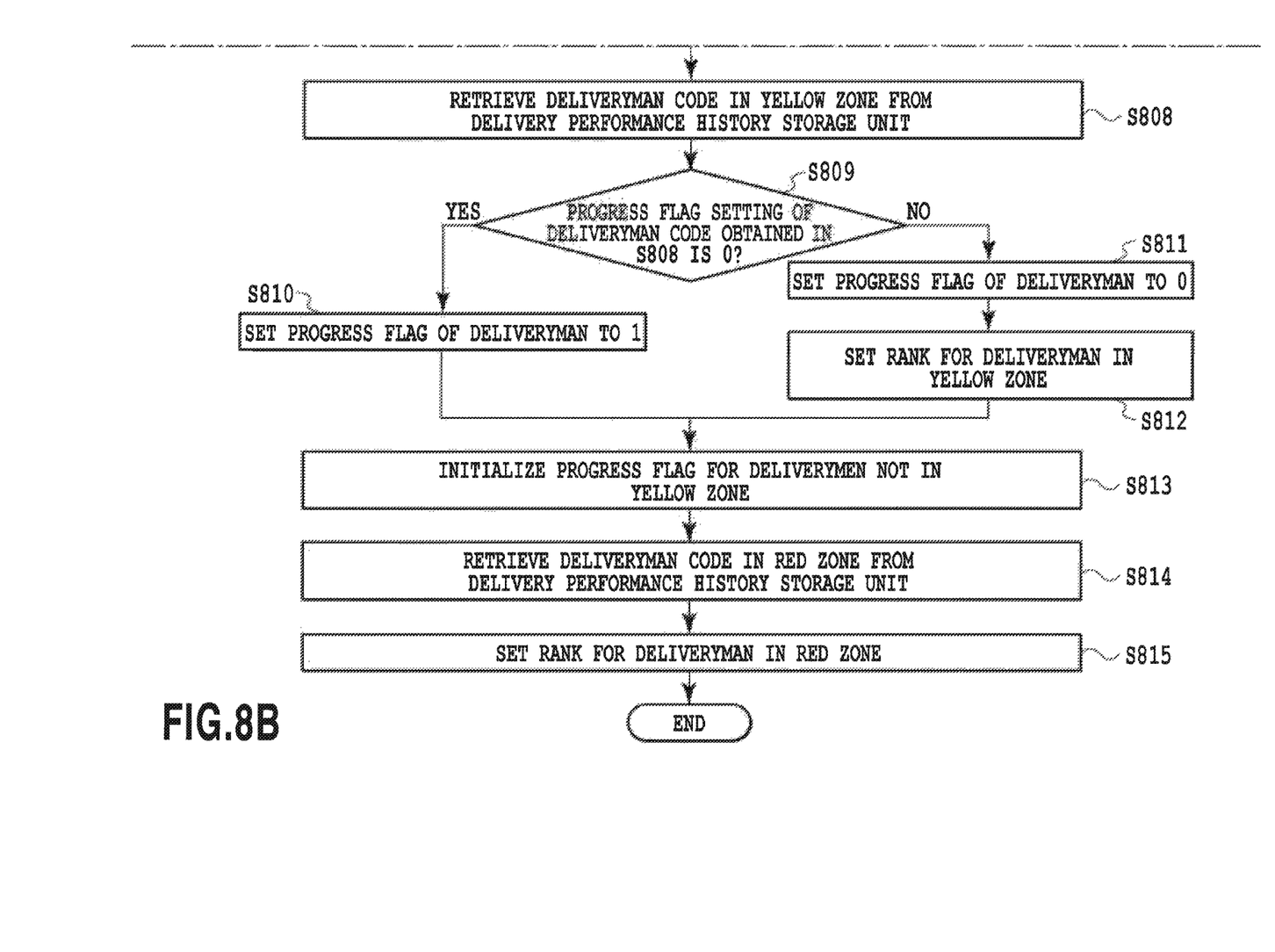
FIG. 8B is a flowchart illustrating a process of setting a delivery rank count according to an embodiment of the present invention.

Next, a process of setting the delivery count rank according to an embodiment will be described in detail with reference to FIGS. 8A and 8B, which illustrate the flowchart of FIG. 3 in further detail. As illustrated in FIG. 5A, suppose that a deliveryman A (delivery count rank 50), B (delivery count rank 60), C (delivery count rank 60), D (delivery count rank 60), E (delivery count rank 45), and F (delivery count rank 40) for a total of six people work at a delivery base X. In the present embodiment, suppose that the relevant process is executed on Jul. 31, 2012, and that the delivery count ranks in parenthesis indicate the delivery count ranks for the current month (July 2012). Also, in the present embodiment, suppose that data as illustrated in FIG. 6A is accumulated as delivery performance data for the current month at the delivery base X. Note that the present embodiment supposes that the relevant process is initiated by a batch process executed at night on the last day of every month.

The rank setting instruction receiving unit 412 of the delivery server 101, in response to a delivery count rank setting instruction, stores the value of the old rank 1 in the delivery performance history storage unit 410 in the old rank 2. In addition, the rank setting instruction receiving unit 412 stores the value of the rank in the deliveryman data storage unit 408 in the old rank 1 (S801). Furthermore, the rank setting instruction receiving unit 412 respectively stores the values of the total transmitted count, the total actual count, the stipulated number of attendances, and the actual number of attendances from the delivery performance storage unit 409 in the delivery performance history storage unit 410 (S802). After that, the rank setting instruction receiving unit 412 initializes the total transmitted count, the total actual count, the stipulated number of attendances, and the actual number of attendances in the delivery performance storage unit 409, specifically, stores 0 in the total transmitted count, the total actual count, and the actual number of attendances, and stores the stipulated number of attendances for the next month in the stipulated number of attendances (S803). In the present embodiment, as illustrated in FIG. 6B, the total transmitted count, the total actual count, the stipulated number of attendances, and the actual number of attendances are initialized, and the stipulated number of attendances for August 2012 is stored in the stipulated number of attendances.

The setting unit 413 of the delivery server 101, on the basis of the total transmitted count and the total actual count in the delivery performance history storage unit 410, calculates and stores the total undelivered task count and the undelivered task rate in the delivery performance history storage unit 410 (S804). In the present embodiment, the total undelivered task count and the undelivered task rate are stored as illustrated in FIG. 7.

Also, the setting unit 413, on the basis of the stipulated number of attendances and the actual number of attendances in the delivery performance history storage unit 410, calculates and stores the work attendance rate in the delivery performance history storage unit 410 (S805). In the present embodiment, the work attendance rate is stored as illustrated in FIG. 7.

Subsequently, the setting unit 413 sets the delivery count rank of each deliveryman on the basis of the undelivered task rate and the work attendance rate. In the present embodiment, the delivery count rank of each deliveryman is set on the basis of the total undelivered task count and the progress flag in addition to the undelivered task rate and the work attendance rate.

The setting unit 413 refers to the delivery performance history storage unit 410, and retrieves any deliveryman code for which the total undelivered task count is a single-digit number, the undelivered task rate is less than 1%, and the work attendance rate is 100% (S806). In this specification, the parameters indicated in S806 are designated the blue zone. In the present embodiment, the deliveryman code 1 satisfying the blue zone parameters is obtained.

The setting unit 413 refers to the deliveryman data storage unit 408 using the deliveryman code obtained in S806, and sets the delivery count rank by adding 5 to the rank of the relevant deliveryman (S807). In the present embodiment, the setting unit 413 adds 5 to the rank 50 of the deliveryman A with the deliveryman code 1 to set 55, as illustrated in FIG. 5B.

The setting unit 413 refers to the delivery performance history storage unit 410, and retrieves any deliveryman code for which the undelivered task rate is from 5.0% to 9.9% (S808). In this specification, the parameters indicated in S808 are designated the yellow zone. In the present embodiment, the deliveryman codes 3 and 4 satisfying the yellow zone parameters are obtained.

The setting unit 413 refers to the delivery performance storage unit 409 using the deliveryman code obtained in S808, and determines the setting of the progress flag of the relevant deliveryman (S809). If the progress flag setting of the deliveryman is 0, the setting unit 413 sets the progress flag of the relevant deliveryman to 1 (S810). If the progress flag setting of the deliveryman is 1, the setting unit 413 sets the progress flag of the relevant deliveryman to 0 (S811). Furthermore, the rank setting unit 413 sets the delivery count rank by subtracting 5 from the rank of the relevant deliveryman in the deliveryman data storage unit 408 (S812).

In the present embodiment, for the deliveryman with the deliveryman code 3, the progress flag setting is 0, and thus the process proceeds to S810, and the progress flag of the deliveryman with the deliveryman code 3 is set to 1, as illustrated in FIG. 6C. For the deliveryman with the deliveryman code 4, the progress flag setting is 1, and thus the process proceeds to S811, and the progress flag of the deliveryman with the deliveryman code 4 is set to 0, as illustrated in FIG. 6C. Furthermore, as illustrated in FIG. 5B, the rank 60 of the deliveryman D with the deliveryman code 4 is subtracted by 5 and set to 55.

In other words, the deliveryman code 3 with a progress flag setting of 0 in S809 was not in the yellow zone in the delivery count rank setting process performed last month (Jun. 30, 2012), and thus the progress flag is set to 1, indicating that progress is being checked. On the other hand, the deliveryman code 4 with a progress flag setting of 1 in S809 was in the yellow zone in the delivery count rank setting process performed last month (Jun. 30, 2012), and thus a progress check has continued for two months. As a result, the delivery rank is set to low, and the progress flag is initialized to 0.

The setting unit 413 refers to the delivery performance storage unit 409 using the deliveryman code obtained in S808, and initializes to 0 the progress flag of any deliveryman not included among the deliveryman codes obtained in S808 (S813). In the present embodiment, since the rank of a deliveryman is subtracted when a progress check continues for two months, the progress flag is reset for deliverymen who are not in the yellow zone for the current month (including deliverymen in the blue zone or the red zone discussed later).

The setting unit 413 refers to the delivery performance history storage unit 410, and retrieves a deliveryman code for which the undelivered task rate is 10% or more (S814). In this specification, the parameter indicated in S814 is designated the red zone. In the present embodiment, the deliveryman code 6 satisfying the red zone parameter is obtained.

The setting unit 413 refers to the deliveryman data storage unit 408 using the deliveryman code obtained in S814, and sets the delivery count rank by subtracting 5 from the rank of the relevant deliveryman (S815). In the present embodiment, the setting unit 413 subtracts 5 from the rank 40 of the deliveryman F with the deliveryman code 6 to set 35, as illustrated in FIG. 5B.

As above, according to the present invention, by appropriately setting the delivery count rank of deliverymen, delivery volume may be controlled according to delivery count rank, and gas cylinders may be supplied stably. Also, by varying wages according to the delivery count rank that reflects the delivery performance of the deliverymen, it is possible to pay wages commensurate with the delivery performance of the deliverymen.

(Process of Outputting Delivery Performance)

Next, a process of outputting delivery performance according to an embodiment will be described. Suppose that a user at a delivery center connects to the delivery server 101 via a client computer 103, and transmits a delivery performance output instruction.

Figure 9:
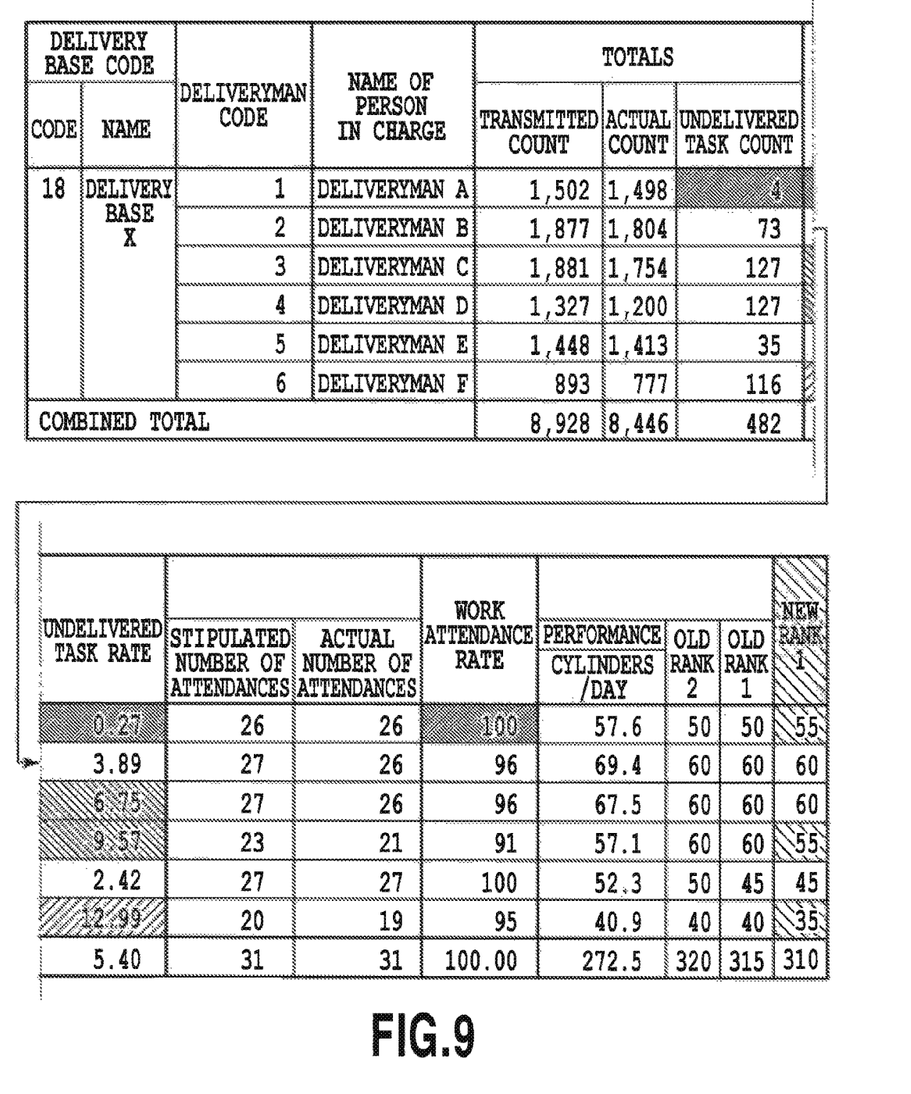
FIG. 9 is a diagram illustrating an exemplary delivery performance display according to an embodiment of the present invention.

The delivery performance outputting unit 414 of the delivery server 101 receives the delivery performance output instruction, and uses the deliveryman data storage unit 408 and the delivery performance history storage unit 410 to transmit a delivery performance display to the client computer 103. In an embodiment, as illustrated in FIG. 9, the delivery performance outputting unit 414 may highlight the total undelivered task count, undelivered task rate, and work attendance rate that cause a change in the delivery count rank setting. Also, as illustrated in the same drawing, the delivery performance outputting unit 414 may highlight the new rank of a deliveryman that has changed from the old rank 1.

Although the present embodiment illustrates only a single delivery base as an example, the delivery performance outputting unit 414 may also output delivery performance for multiple delivery bases.

As above, according to the present invention, by outputting the delivery performance of a delivery base, it is possible to support decision-making regarding the deliveryman's capability that should be ensured for the delivery base overall, while taking into account appropriate delivery count ranks. In other words, in the management of personnel to assign to a delivery area, it is possible to strive for an appropriate personnel configuration that is based on delivery count rank.

The invention claimed is:

1. A system for setting a delivery count rank for delivering gas cylinders, comprising:
   a storage device that stores deliveryman information for each deliveryman, delivery performance information for each deliveryman and predetermined period, and delivery performance history information for each deliveryman and predetermined period, the deliveryman information including at least a deliveryman code and a delivery count rank, the delivery performance information including at least the deliveryman code, a progress flag indicating whether or not each deliveryman is subject to a progress check, and a performance in a designated period, and the delivery performance history information including at least the deliveryman code, the performance in the designated period, and an old rank, the performance including a total transmitted count, a total actual count, a stipulated number of attendances, and an actual number of attendances; and
   processor configured to:
   set the old rank included in the delivery performance history information on the basis of the delivery count rank included in the deliveryman information;

set the performance included in the delivery performance history information on the basis of the performance included in the delivery performance information;

calculate a total undelivered task count and an undelivered task rate on the basis of the total transmitted count and the total actual count included in the delivery performance history information, calculate a work attendance rate on the basis of the stipulated number of attendances and the actual number of attendances included in the delivery performance history information, and set a delivery count rank included in the deliveryman information on the basis of the total undelivered task count, the undelivered task rate, the work attendance rate, and the progress flag included in the delivery performance history information;

specify a deliveryman in a blue zone on the basis of the total undelivered task count, the undelivered task rate, and the work attendance rate, and set the delivery count rank in the blue zone included in the deliveryman information;

specify a deliveryman in a yellow zone on the basis of the undelivered task rate, and determine the setting of the progress flag in the yellow zone included in the delivery performance information;

if the progress flag indicates that the deliveryman is not subject to a progress check, set the progress flag in the yellow zone included in the delivery performance information to a value indicating that the deliveryman is subject to a progress check;

if the progress flag indicates that the deliveryman is subject to a progress check, set the progress flag in the yellow zone included in the delivery performance information to a value indicating that the deliveryman is not subject to a progress check, and in addition, set the delivery count rank in the yellow zone included in the deliveryman information;

set the progress flag other than the specified deliveryman in the yellow zone included in the delivery performance information to a value indicating that the deliveryman is not subject to a progress check;

specify a deliveryman in a red zone on the basis of the undelivered task rate, and set the delivery count rank in the red zone included in the storage device included in the deliveryman information; and in response to a delivery performance output instruction, output at least the deliveryman code, the delivery count rank and the old rank from the deliveryman information and the delivery performance history information.

2. The system according to claim 1, wherein the processor further configured to:

update the total transmitted count, the total actual count, and the actual number of attendances included in the delivery performance information;

in response to the generation of delivery schedule data per deliveryman, add to the total transmitted count a number of gas cylinders that a deliveryman should deliver on a delivery due date included in that delivery schedule data per deliveryman;

use delivery data to add to the total actual count a number of gas cylinders for which delivery was completed by a deliveryman on the delivery due date included in the delivery data, and increment a value of the actual number of attendances in response to the updating of the total actual count.

* * * * *